United States Patent
Basavanhally et al.

(10) Patent No.: US 6,757,113 B1
(45) Date of Patent: Jun. 29, 2004

(54) OPTICAL GRATING MOUNT

(75) Inventors: Nagesh R. Basavanhally, Skillman, NJ (US); David A. Ramsey, Annandale, NJ (US); Hong Tang, Belle Mead, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/391,309

(22) Filed: Mar. 18, 2003

(51) Int. Cl.[7] .................................................. G02B 7/02
(52) U.S. Cl. ...................................... 359/819; 359/822
(58) Field of Search ................................. 359/818, 819, 359/820, 822, 829

(56) References Cited

U.S. PATENT DOCUMENTS 5,986,827 A * 11/1999 Hale ........................... 359/822
6,307,657 B1 * 10/2001 Ford ............................... 398/9
2003/0107796 A1 * 6/2003 Bar et al. ..................... 359/291
2003/0202260 A1 * 10/2003 Meehan et al. .............. 359/822

* cited by examiner

*Primary Examiner*—Ricky Mack

(57) ABSTRACT

Apparatus and method for allowing fine adjustment of a diffraction grating within an optical wavelength-division multiplexing (WDM) device and for maintaining the grating in near-littrow alignment (i.e., to within an accuracy of +/−0.003 degrees) over the device's operating temperature range. Precise alignment is maintained by use of a 0.3 PPM/° C. "super invar" material in a wedge-shaped grating mount to eliminate an angular shift of the grating over typical operating temperatures. The wedge-shaped grating mount and thereby the orientation of the surface of the grating are adjusted precisely and maintained in position over the operating temperatures via a dual flexure structure wherein four precision adjustment screws with jeweled contact tips are tightened to achieve the desired orientation and stiffen the structure and then locked via locking nuts to prevent slippage.

29 Claims, 2 Drawing Sheets

OPTICAL GRATING MOUNT

BACKGROUND OF THE INVENTION

1. Field of the Invention

The present invention relates to optical communications and, more specifically, to precision mechanical mounting mechanisms for optical components.

2. Description of the Related Art

Wavelength-division multiplexing (WDM) (also known as dense-wavelength-division multiplexing (DWDM)) has been shown as a promising approach for increasing the capacity of existing fiber optic networks. A communications system employing WDM uses multiple optical signal channels, each channel being assigned a particular channel wavelength. In such a WDM system, optical signal channels are typically generated, multiplexed to form an optical signal comprised of the individual optical signal channels, transmitted over a waveguide, and demultiplexed such that each channel wavelength may be individually routed or switched.

One demultiplexing technique involves the use of an optical diffraction grating to separate the wavelengths of an incident optical signal into its constituent channels. Such a technique is described in detail in U.S. Pat. No. 6,307,657 (herein "the '657 patent"), incorporated herein by reference in its entirety.

As described the '657 patent, relative alignment of various optical components within the device including the optical grating is important to proper operation of the device. The '657 patent discusses techniques for relative adjustment of these components, maintenance of reasonable relative alignment between the components over temperature, and aspects of the design that afford tolerance to misalignment. However, as the wavelength spacing between channels in WDM systems decreases, the tolerance of the grating angle with respect to the incident light also decreases. Additionally, as optical components (e.g. micro-mirror arrays) and the devices that incorporate them are made smaller and smaller to accommodate more channels in less space, the linear distance associated with the angular tolerance of the grating location also decreases. These trends lead to the need for increasingly more accurate adjustment and temperature compensation, maintenance, and athermalization mechanisms.

SUMMARY OF THE INVENTION

Problems in the prior art are addressed in accordance with principles of the invention by an apparatus and method for enabling coarse and fine alignment adjustment of a diffraction grating within an optical wavelength-division multiplexing (WDM) device and for maintaining the diffraction grating in near-littrow alignment (e.g., to within an accuracy of +/−0.003 degrees) over the device's operating temperature (e.g., −5.0° C. to 65° C.).

In a preferred embodiment, precise grating alignment is maintained in a WDM device by use of a 0.3 parts-per-million per degree centigrade (PPM/° C.) Super Invar alloy (e.g., 63Fe-32Ni-5Co) in a wedge-shaped grating mount for the optical grating to eliminate an angular shift of the grating over temperature that is typical in the prior art due to use of other materials such as Invar (e.g., 64Fe-36Ni).

The grating mount is affixed to a first platform whose angle along a first axis is adjustable relative to a second platform. The first platform is attached to the second platform via a first flexure spring oriented parallel to the first axis and the angle is adjusted using first and second adjustment screws. The screws are threaded through the second platform on opposing sides of the first flexure spring and the tips of the screws make contact with the first platform to adjust the angle. The second platform is attached to a base platform (i.e., the grating assembly mounting base) via a second flexure spring oriented parallel to a second axis, the second axis being substantially orthogonal to the urst axis. The angle between the second and base platforms is adjusted using third and fourth screws. In one or more embodiments, adjustment screws are tipped with a jeweled or other low-friction element and mated to their respective platforms via a ball-and-socket arrangement that prevents incremental slippage of the contact over time and temperature and thus prevents minor changes in the angle between the platforms.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Device Construction

Figure 1:
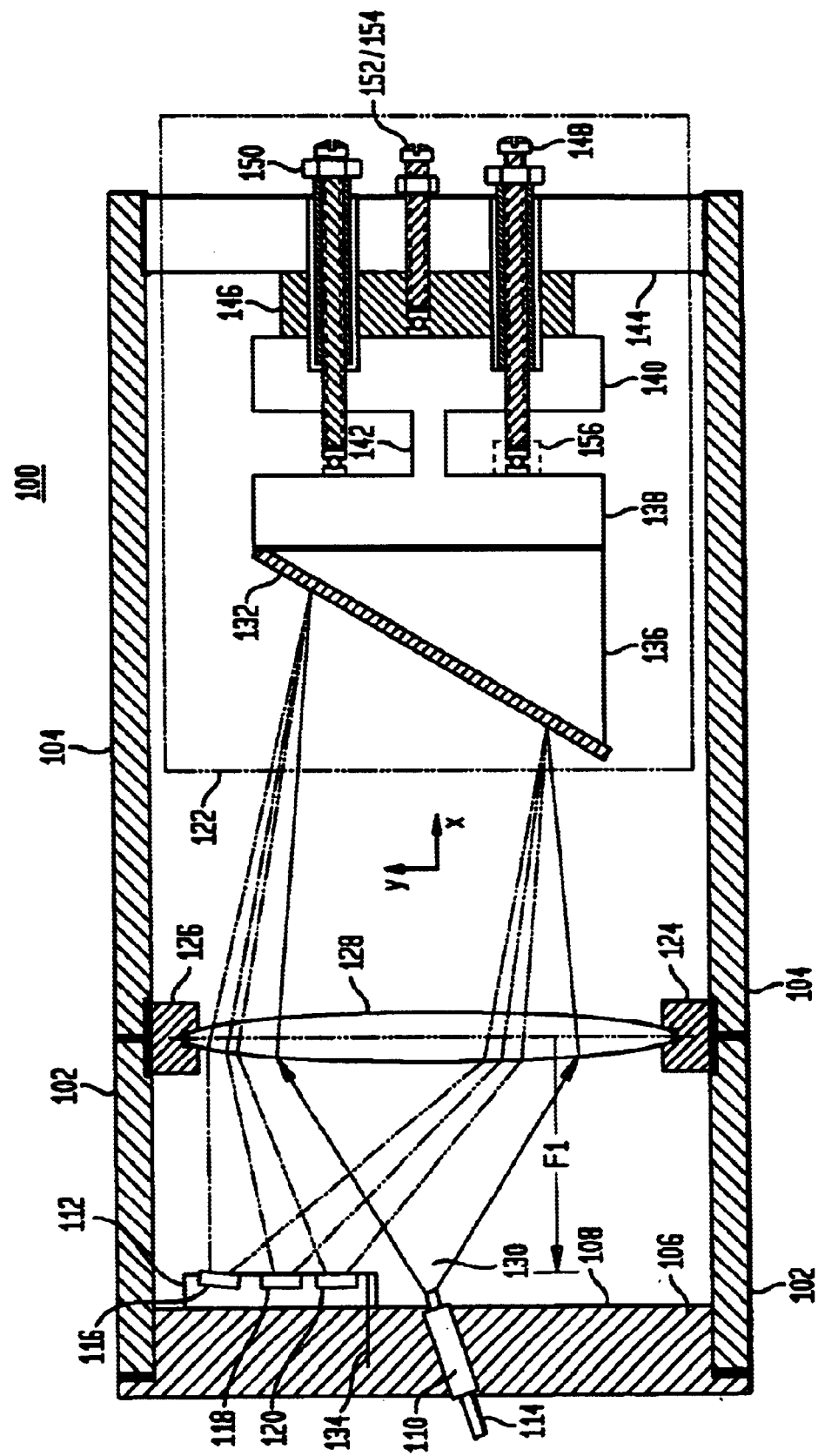
FIG. 1 is a cutaway illustration of the functional components of an optical wavelength-division multiplexing (WDM) device, according to one embodiment of the present invention.

FIG. 1 is a cutaway illustration of an optical wavelength-division multiplexing (WDM) device 100, according to one embodiment of the present invention. FIG. 1 shows only those elements of the device that are relevant for the present discussion. Also, although the actual device is a three-dimensional object, the only components illustrated are (1) those that would be visible from a view that is normal to the X-Y plane of the device and (2) those components that can be unambiguously represented using semi-transparency or cutaways. Further, the illustration is not to scale and components are relatively sized to better illustrate their function or functional relationship to other components.

Device 100 includes a frame that is preferably implemented in the form of a tube that is open at both ends. The frame may be composed of a single material or multiple materials that are affixed together to achieve a specific composite coefficient of expansion with respect to an operating temperature range of interest. The materials are affixed to each other preferably using welds (e.g., for metal-to-metal bonds) or epoxy (for composite material bonds) though other methods of attachment would also apply such as rivets, screws, slots, and braces as would be understood to one skilled in the art.

As illustrated, the frame of optical device 100 is composed of two materials 102 and 104 welded together. Affixed to the left end of the frame is mounting platform 106. The attachment is such that right surface 108 of mounting platform 106 may move relative to the frame given thermal expansion or contraction of the mounting platform over the operating range of the device.

Affixed to mounting platform 106 (via a cut-through) is fiber-optic coupler 110 and affixed to right surface 108 of mounting platform 106 is micro-electro-mechanical system (MEMS) micro-mirror array 112. Fiber-optic coupler 110 enables input/output fiber 114 to be coupled to device 100. MEMS micro-mirror array (MMA) 112 includes micro-mirrors 116, 118, and 120, each of which can be tilted relative to the Y-Z plane (i.e. rotated about Y-axis and/or rotated about the Z-axis independently) under control of an external microcontroller (not illustrated). For clarity of illustration, the MMA of FIG. 1 is depicted as only including three micro-mirrors. However, in practice, devices according to this invention may include MMAs having tens or even hundreds of micro-mirror elements as would be understood to one skilled in the art.

Also affixed to the frame are optical diffraction grating subsystem 122 and (via support mounts 124 and 126) achromatic compound field lens 128.

Device Operation

Device 100 may accomplish a number of different functions including WDM signal equalization, wavelength dropping, and wavelength switching depending on how it is used, although it would be understood that any device that makes use of an optical grating for related purposes and requires an accurate angular mounting of the grating and maintenance over temperature of that mounting would benefit from this invention.

As illustrated in FIG. 1, a single fiber 114 carrying a WDM signal composed of three wavelengths ($\lambda_1, \lambda_2$, and $\lambda_3$) is coupled into device 100 using fiber optic coupler 110. Light from the fiber diverges at aperture 130 and is incident upon the left-hand side of field lens 128. Field lens 128 accomplishes, among other things, the task of collimating the incident light which then strikes the surface of optical grating 132. At the grating, the light is angularly split into its constituent wavelengths and reflected back toward field lens 128. The light of each constituent wavelength is focused by lens 128 onto a different micro-mirror of MMA 112. Specifically, the light of constituent wavelength $\lambda_1$ is focused onto micro-mirror 120, the light of constituent wavelength $\lambda_2$ is focused onto micro-mirror 118, and the light of constituent wavelength $\lambda_3$ is focused onto micro-mirror 116.

When the device operates as an equalizer, the angular rotation of each micro-mirror about the Y-axis and the Z-axis is nominally controlled such that the surface of the micro-mirror is normal to the light of the constituent wavelength that is incident upon it (this is the micro-mirrors nominal orientation). In this configuration, all of the light of the different wavelengths is reflected back from the micro-mirrors to the field lens where it is collimated in the direction of the grating. At grating 132, the angular separation of the wavelengths is removed and the resulting multiple-wavelength light signal is reflected back toward the field lens. The light is focused by lens 128 onto aperture 130 of input fiber 114 where it is coupled by a circulator (not shown) to the output path.

In the case where the powers of all constituent wavelengths in the input WDM signal are equal, the micro-mirrors are preferably set to their nominal orientations. However, in cases where the powers are not equal, one or more of the micro-mirrors can be rotated (e.g., about the Z-axis) so that a percentage of light of the corresponding constituent wavelengths of the signal is not fully coupled back into the fiber. For example, if the light of wavelength $\lambda_1$ is "hot" relative to $\lambda_2$ and $\lambda_3$ and needs to be attenuated, micro-mirror 120 may be angled slightly away from its nominal orientation to the incident light. As a result, some portion of the $\lambda_1$ light that is reflected back from micro-mirror 120 will fail to be coupled back into the aperture at 130 following reflection from grating 132. The result will be an equalization of the incoming WDM signal.

By significantly angling one or more of the mirrors, it is possible to substantially eliminate the corresponding wavelength from the output coupling at aperture 130. In an embodiment in which an array of optical fibers are mounted on mounting platform 106, a device similar to device 100 can be used to implement wavelength adding, dropping, multiplexing, and/or demultiplexing functions by appropriately rotating one or more of the micro-mirrors to switch one or more of the wavelengths from one or more incoming fibers to one or more different outgoing fibers.

Compensation for Thermal Expansion/Contraction

The distance F1 between the right side 134 of MMA 112 and the center of field lens 128 is selected to provide optimal optical performance (e.g., based on the focal distance of field lens 128). If the distance F1 were to change, then the image of the constituent wavelengths upon each micro-mirror of MMA 112 would be out of alignment. Such misalignment might contribute to signal degradation and cross-talk. To avoid this, the materials used for components 106 and 102 are chosen such that the distance F1 between the right side of MMA 112 and the center of field lens 128 is maintained essentially constant over temperature. This is done by choosing materials such that the coefficient of expansion of the material of component 102 multiplied by the length (i.e., in the X-dimension) of that component is equal to the coefficient of expansion of the material of component 106 multiplied by the length of that component. In this case we have considered the expansion of the MMA itself to be negligible but that may also considered in implementations where it is of significant scale. Note that the distance between the lens and the grating is less sensitive to minor changes over temperature because of the collimating effect of the field lens on the grating side of the lens.

Optical Grating Subsystem

Optical grating subsystem 122 is designed to fix and maintain (over the device operating temperature) the angle of grating 132 relative to the incident light from field lens 128 to within an accuracy of +/−0.003 degrees. This requirement is dictated by the properties of the grating (e.g. groove spacing). The angle of the grating is coarsely set by affixing the grating to wedge 136 that has been machined to approximately exhibit the desired relative angle. Wedge 136 is constructed of Super-Invar (63Fe-32Ni-5Co) or a similar material that exhibits a coefficient of expansion $\leq 0.3$ PPM/° C. Wedge 136 is mounted to wedge-mounting platform 138. Assuming wedge-mounting platform 138 can be adjusted to set the grating to the desired angle and maintain this angle to within the desired accuracy over operating temperature, the angular error caused by the small (0.3 PPM/° C.) coefficient of expansion of the wedge will be maintained within tolerance of the device's operation. If the coefficient of expansion of the wedge material were greater than 0.3 PPM/° C., then the device might fail to operate within specifications.

Wedge-mounting platform 138 is attached to adjustment platform 140 using horizontal flexure spring 142, and adjustment platform 140 is attached to grating subsystem base 144 using vertical flexure spring 146. Horizontal flexure spring 142 allows movement of the wedge-mounting platform (and thereby the wedge and the optical grating) substantially in the X-Y plane, while vertical flexure 146 allows movement of the wedge-mounting platform substantially in the X-Z plane. These movements, if small, can be seen at the surface of the grating to approximate minute changes in the angle of the grating. Specifically, flexion of horizontal spring 142 results in angular rotation of the grating about the Z-axis, while flexion of vertical spring 146 results in angular rotation of the grating about the Y-axis.

The angle between wedge-mounting platform 138 and adjustment platform 140 is adjusted using upper and lower precision screws 148–150. For example, to achieve a small clockwise rotation (as seen in FIG. 1) of the grating about the Z-axis, lower precision screw 148 is first brought into contact with the lower portion of wedge-mounting platform 138 and then tightened until the desired clockwise rotation is achieved (corresponding to flexion of flexure spring 142). The upper precision screw 150 is then brought into contact with the upper portion of wedge-mounting platform 138 to achieve stiffening of the structure (e.g., to provide additional robustness to vibration).

The angle between adjustment platform 140 and grating system base 144 is adjusted using foreground precision screw 152 (visible in FIG. 1) and background precision screw 154 (hidden in FIG. 1 behind foreground precision screw 152). For example, to achieve a small clockwise rotation (as viewed from the top of FIG. 1 looking along the Y-axis) of the grating about the Y-axis, foreground precision screw 152 is first brought into contact with the foreground portion of adjustment platform 140 and then tightened until the desired clockwise rotation is achieved (corresponding to flexion of flexure spring 146). The background precision screw 154 is then brought into contact with the background portion of adjustment platform 140 to achieve stiffening of the structure.

Figure 2:
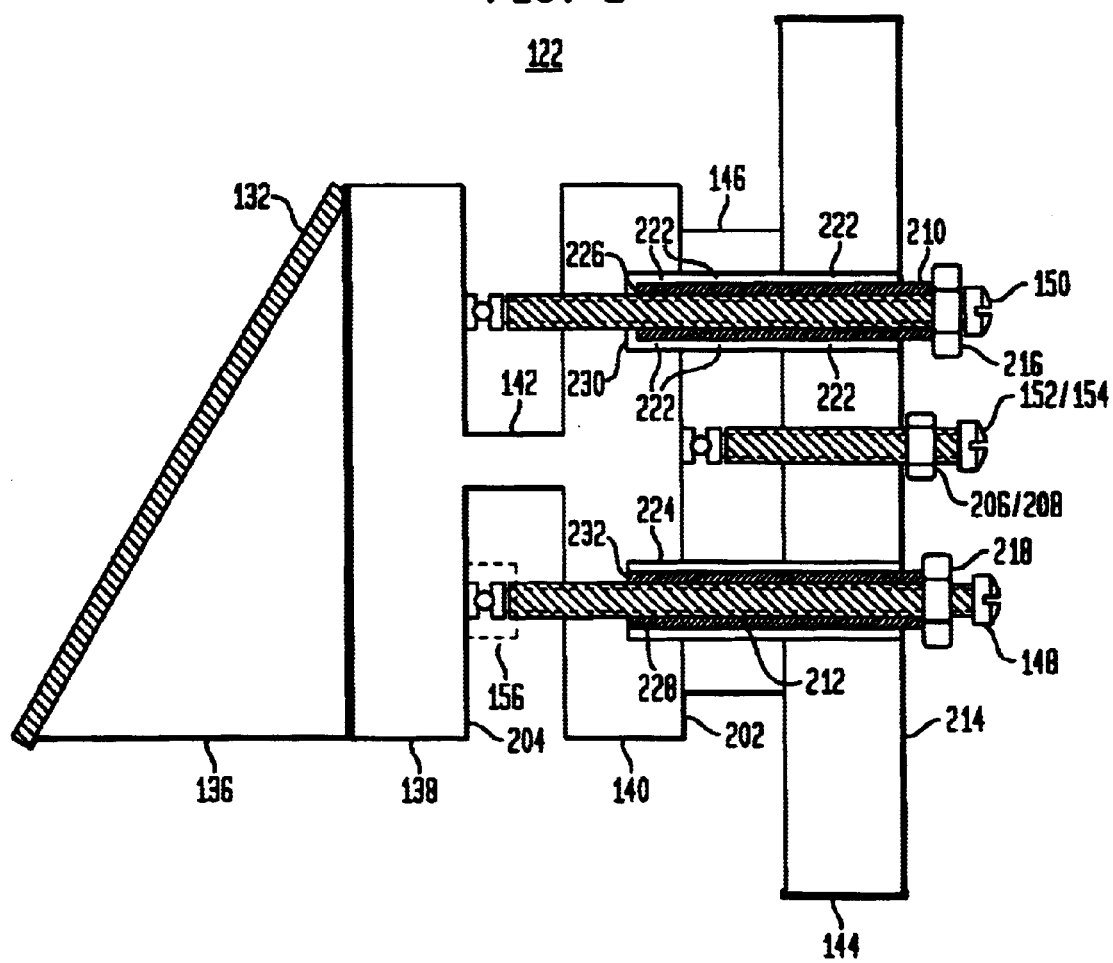
FIG. 2 is an enlarged view the optical grating subsystem 122 of FIG. 1.

Additional elements of this embodiment are now discussed with respect to the enlarged view of grating subsystem 122 provided in FIG. 2. As previously described, angular adjustment of the grating is achieved using precision screws. These screws are typically made of #416 stainless steel and have greater than 100 threads per inch. Precision screws 152–154 are threaded into (at least a portion of) grating subsystem base 144 and may extend through base 144 to make contact with rightmost face 202 of adjustment platform 140. In particular, foreground screw 152 can be tightened to make contact with the foreground portion of face 202, and background screw 154 can be tightened to make contact with the background portion of face 202. Precision screws 148–150 pass through grating subsystem base 144, flexure spring 146, and the rightmost portion of adjustment platform 140, and can be threaded into the leftmost portion of adjustment platform 140 to extend through platform 140 to make contact with rightmost face 204 of wedge-mounting platform 138. In particular, upper screw 150 can be tightened to make contact with the upper portion of face 204, and lower screw 148 can be tightened to make contact with the lower portion of face 204. Once the screws are tightened to the achieve the desired orientation of the grating (as discussed previously), locking nuts 206 (shown) and 208 (hidden in this view) and 216 and 218 are tightened to prevent slipping of precision screws 152–154 and 148–150, respectively. For generality, two different types of locking nuts are illustrated in FIG. 2, although any locking mechanism that prevents rotational slippage of the precision adjustment screws in this configuration could be used, as would be understood to one skilled in the art.

Foreground (illustrated) 206 and background (hidden in this view) 208 locking nuts are conventional nuts that are tightened until they make contact with rightmost surface 214 of base 144. Note that corresponding elements of the upper and lower precision screws and locking nuts are the same. Upper and lower locking nuts 216 and 218 are sleeve-type nuts whose sleeves 210 and 212, respectively pass through base 144, spring 146, and the rightmost portion of platform 140 and are tightened against the leftmost edges 230 and 232 of sleeve right-of-ways 222 and 224. Sleeve right-of-ways 222 and 224 provide clearance around screws 148 and 150 and their locking-nut sleeves 210 and 212 to allow the screws and locking-nut sleeves to pass through. As illustrated, the lower locking nut is shown in locked position with the leftmost portion 228 of the sleeve 212 in contact with the leftmost portion of the right-of-way 232. In an alternative implementation, sleeve right-of-way 222 and 224 do not extend into platform 140. In this case, the leftmost surfaces 226, and 228 of the sleeves of the locking nuts will tighten against the right surface 202 of platform 140.

Contact Between Screw and Platform

To provide for low-friction contact between the adjustment screws 148, 150, 152, and 154 and their respective contact surfaces 204 and 202 both during adjustment and during operation over the device operating temperature (e.g., –5.0° C. to 65° C.), each adjustment screw is tipped with a jeweled or other low-friction element and mated to its contact surface via a low-friction-surfaced ball (e.g., a jewel element such as sapphire) and low-friction socket arrangement 156. Each ball-and-socket arrangement might be encapsulated in a conformal sleeve or similar container to prevent loss of components when the screw tip is not in direct contact with its target surface or the socket may hold the ball in place. Depending on the implementation, the arrangement may move with the screw tip, may be affixed to the contact surface, or may contain some elements that are affixed to the screw tip, some that are affixed to the contact surface, and some that are held in alignment by the container. Such arrangements prevent incremental slippage of the contact over time and temperature and thus prevent minor angular changes between the platforms.

Figure 3:
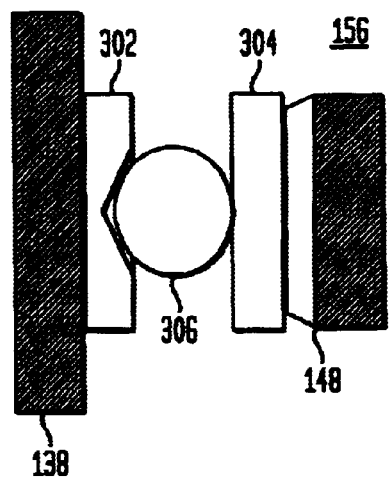
FIG. 3 is a detail view of jeweled contact arrangement 156 of FIG. 2.

FIG. 3 provides a detail view of one possible implementation of a low-friction ball-and-socket arrangement 156 of FIGS. 1 and 2. As shown, a left, concave jewel-surfaced socket (e.g., sapphire V-cup) 302 is affixed to the contact platform (e.g., 138) and a right, flat jeweled disc (e.g. sapphire disc) 304 is affixed to the end of the screw (e.g., screw 148). The disc and the socket may be affixed to their respective surfaces via high temperature cure hard epoxy or similar method. A jeweled sphere (e.g., sapphire ball) 306 is free to move between the socket and disc and accommodate the slight rotation of the contact platform and the corresponding slight deviation of the contact angle away from normal upon tightening of the screws. The conformal sleeve or other suitable container for retaining ball 306 in place between sockets 302 and 304 is not shown in FIG. 3. As would be understood to one skilled in the art, disc 304 and ball and socket arrangement 302 and 306 may be transposed such that the disc is affixed to platform 138 and the ball and socket arrangement are secured to the tip of screw 148. Also alternatively in either of the prior cases the ball and socket arrangement might be such that the ball is held in place by the socket.

Although the present invention has been described in the context of a structure for mounting and orienting an optical grating in a WDM optical device, the invention is not so limited. In general, the present invention can be used to mount and orient other structures in other types of devices.

Although the embodiment described in the text discusses the use of "super-invar" material for the wedge, other materials of similarly low coefficient of expansion could also be used.

Although the embodiment of FIG. 2 is described as having two flexure springs allowing independent movement of the mounting platform with respect to two planes that are orthogonal to each other, other implementations are also possible, as long as the allowed planes of movement are not parallel such that the orientation of the mounting platform can be adjusted in three-dimensions.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. Apparatus for mounting an optical element in an optical device, the apparatus comprising:
   a base;
   an adjustment platform connected to the base by a first flexure spring; and
   a mounting platform adapted to support the optical element and connected to the adjustment platform by a second flexure spring, wherein:
      the first flexure spring enables the adjustment platform to move relative to the base in a first plane;
      the second flexure spring enables the mounting platform to move relative to the adjustment platform in a second plane that is non-parallel to the first plane;
      orientation of the adjustment platform relative to the base is controlled by a first set of one or more screws; and
      orientation of the mounting platform relative to the adjustment platform is controlled by a second set of one or more screws.

2. The invention of claim 1, wherein:
   the optical element is a diffraction grating; and
   the mounting platform is adapted to support the diffraction grating mounted onto a wedge structure.

3. The invention of claim 2, wherein the wedge structure is made of a Super-Invar material.

4. The invention of claim 1, wherein the base, the adjustment and mounting platforms, and the first and second flexure springs are formed from a single piece of material.

5. The invention of claim 1, wherein:
   the first set of screws comprise two screws, one on each side of the first flexure spring; and
   the second set of screws comprise two screws, one on each side of the second flexure spring.

6. The invention of claim 1, wherein each screw is adapted to contact its corresponding platform via a ball-and-socket arrangement.

7. The invention of claim 1 wherein each screw is adapted to receive a locking nut to prevent slippage of the screw.

8. The invention of claim 1, wherein each screw is adapted to contact its corresponding platform via a ball-and-socket arrangement.

9. The invention of claim 8, wherein the ball-and-socket arrangement incorporates at least one sapphire jewel.

10. The invention of claim 1, wherein:
    orientation of the adjustment platform relative to the base comprises adjusting a first screw of the first set to orient the adjustment platform relative to the base and adjusting a second screw of the first set to stiffen the adjustment platform/base arrangement; and
    orientation of the mounting platform relative to the adjustment platform comprises adjusting a first screw of the second set to orient the mounting platform relative to the adjustment platform and adjusting a second screw of the second set to stiffen the mounting platform/adjustment platform arrangement.

11. An optical device comprising:
    a base;
    an adjustment platform connected to the base by a first flexure spring;
    a mounting platform connected to the adjustment platform by a second flexure spring;
    an optical element connected to the mounting platform, wherein:
       the first flexure spring enables the adjustment platform to move relative to the base in a first plane;
       the second flexure spring enables the mounting platform to move relative to the adjustment platform in a second plane that is non-parallel to the first plane;
       orientation of the adjustment platform relative to the base is controlled by a first set of one or more screws; and
       orientation of the mounting platform relative to the adjustment platform is controlled by a second set of one or more screws.

12. The invention of claim 11, wherein:
    the optical element is a diffraction grating; and
    the diffraction grating is mounted to the mounting platform via a wedge structure.

13. The invention of claim 12, wherein the wedge structure is made of a Super-Invar material.

14. The invention of claim 11, wherein the base, the adjustment and mounting platforms, and the first and second flexure springs are formed from a single piece of material.

15. The invention of claim 11, wherein:
    the first set of screws comprise two screws, one on each side of the first flexure spring; and
    the second set of screws comprise two screws, one on each side of the second flexure spring.

16. The invention of claim 11, wherein each screw is adapted to contact its corresponding platform via a ball-and-socket arrangement.

17. The invention of claim 11, wherein each screw is adapted to receive a locking nut to prevent slippage of the screw.

18. The invention of claim 11, wherein each screw is adapted to contact its corresponding platform via a ball-and-socket arrangement.

19. The invention of claim 18, wherein the ball-and-socket arrangement incorporates at least one sapphire jewel.

20. The invention of claim 11, wherein:
    orientation of the adjustment platform relative to the base comprises adjusting a first screw of the first set to orient the adjustment platform relative to the base and adjusting a second screw of the first set to stiffen the adjustment platform/base arrangement; and
    orientation of the mounting platform relative to the adjustment platform comprises adjusting a first screw of the second set to orient the mounting platform relative to the adjustment platform and adjusting a second screw of the second set to stiffen the mounting platform/adjustment platform arrangement.

21. A method for orienting an optical element within an optical device, comprising:

moving an adjustment platform relative to a base, wherein the adjustment platform is connected to the base by a first flexure spring;

moving a mounting platform relative to the adjustment platform, wherein the mounting platform is connected to the adjustment platform by a second flexure spring, wherein:

the first flexure spring enables the adjustment platform to move relative to the base in a first plane;

the second flexure spring enables the mounting platform to move relative to the adjustment platform in a second plane that is non-parallel to the first plane;

orientation of the adjustment platform relative to the base is controlled by a first set of one or more screws; and orientation of the mounting platform relative to the adjustment platform is controlled by a second set of one or more screws.

22. The invention of claim 21, wherein:

moving the adjustment platform relative to the base comprises adjusting a first screw of the first set to orient the adjustment platform relative to the base and adjusting a second screw of the first set to stiffen the adjustment platform/base arrangement; and moving the mounting platform relative to the adjustment platform comprises adjusting a first screw of the second set to orient the mounting platform relative to the adjustment platform and adjusting a second screw of the second set to stiffen the mounting platform/adjustment platform arrangement.

23. The invention of claim 21, wherein:

the optical element is a diffraction grating; and the diffraction grating is mounted to the mounting platform via a wedge structure.

24. The invention of claim 23, wherein the wedge structure is made of a Super-Invar material.

25. The invention of claim 21, wherein the base, the adjustment and mounting platforms, and the first and second flexure springs are formed from a single piece of material.

26. The invention of claim 21, wherein:

the first set of screws comprise two screws, one on each side of the first flexure spring; and the second set of screws comprise two screws, one on each side of the second flexure spring.

27. The invention of claim 21, wherein each screw is adapted to contact its corresponding platform via a ball-and-socket arrangement.

28. The invention of claim 27, wherein the ball-and-socket arrangement incorporates at least one sapphire jewel.

29. The invention of claim 21, wherein each screw is adapted to receive a locking nut to prevent slippage of the screw.

* * * * *